May 16, 1933.　　D. R. HILLIS　　1,909,678
MEASURING DEVICE
Filed March 8, 1930
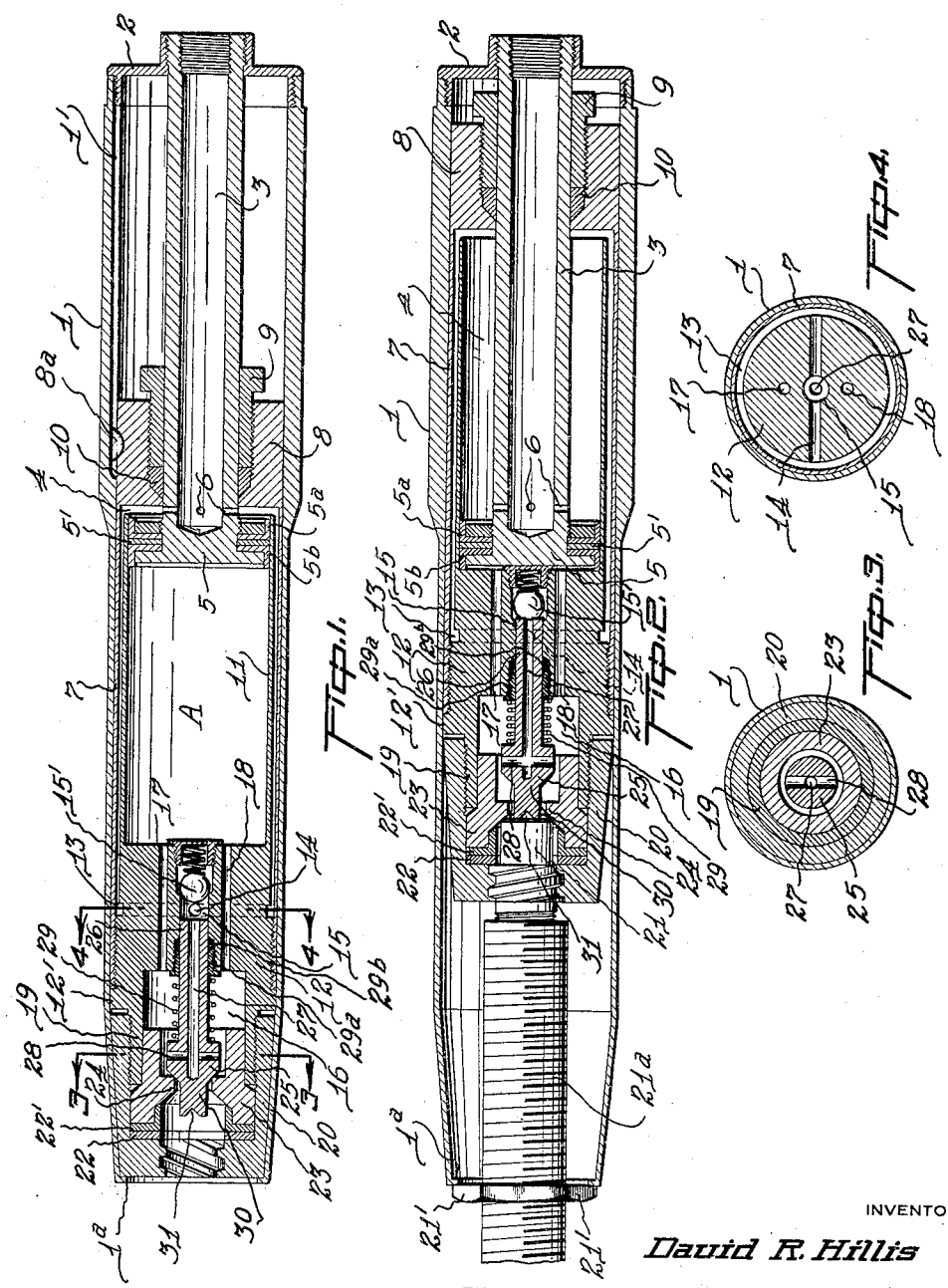
INVENTOR
David R. Hillis
BY
ATTORNEYS Patented May 16, 1933

1,909,678

UNITED STATES PATENT OFFICE

DAVID R. HILLIS, OF DETROIT, MICHIGAN, ASSIGNOR OF ONE-HALF TO H. HALVOR BARROWS, OF DETROIT, MICHIGAN

MEASURING DEVICE

Application filed March 8, 1930. Serial No. 434,402.

The present invention relates to means for supplying to bearings definitely predetermined yet readily variable quantities of lubricant under pressure by means of a simple, self-contained, portable fluid-injecting instrument of fixed capacity in cooperative association with a plurality of fittings serving as metering devices in that they are provided with adjustable stops whose positional relation to the contacting outlet end of the nozzle of said injector determines the quantity of lubricant delivered at each point of application of said injector to the fitting with which the connection to each machine part to be lubricated is equipped.

According to modern ideas as to acceptable engineering and shop practice, there is no longer any excuse for lubricating machine parts through the use of more or less widely separated individual oil and grease cups, some of which may be difficult to get at while others are placed in locations dangerous to approach under operative conditions. Early attempts to apply the idea of concentration so as to do away with what seemingly had been unavoidable scatteration in placing lubricating devices led to the introduction of so-called multiple oilers of both gravity and force-feed type, the parts to be lubricated being detachably connected to the oiler by piping. As compared with the use of separate cups, application of the multiple oiler presented a distinct advance in the art of lubricating bearings, to each of which the quantity of lubricant supplied was regulated in the same manner, for example, as with individual cups of sight feed type.

Centralization by multiple-feed oilers not only presented the advantage of less frequent filling due to increased capacity of the supply tank thereof but also eliminated the necessity for filling cups in hard-to-reach or danger-involving positions.

Experience ultimately developed the now generally recognized fact that only high pressure lubrication permits a maximum degree of concentration of the supply ends of lines of piping carrying lubricant to a multiplicity of bearings with certainty and without regard to the position or location of the center of distribution or point at which the lines are collected for the purpose of facilitating connection of injecting apparatus through which the lubricant is forced into them.

High pressure being essential to positive lubrication, particularly in places where there exists any tendency of bearing ducts to fill up with dust or other particles and thus become clogged, my invention therefore involves the use of a high pressure source of lubricant supply, such as a power driven pump capable of maintaining pressures as high as 3000 pounds and very often higher, an injecting apparatus or device to the receiving end of which the source of lubricant supply is connected either flexibly or in such manner as to permit free movement, and metering devices to measure and control the quantities of lubricant supplied through the injector upon manipulation thereof after its nozzle end is attached to a fitting screwed into or otherwise connected to any one of the metering connectors to which pipe lines from the bearings are led to a conveniently located central point, where the injector may quickly be applied to each of the fittings one after another.

With my improved lubricating system the characteristic multiplicity of pumps of the force-feed multiple oiler is avoided by using a single fixed-capacity injector adapted for individual connection singly to any number of closely grouped fittings at the receiving ends of a corresponding number of pipe lines leading to as many separate bearings.

One of the objects of my invention is the provision of a measuring device having two chambers and wherein the continuous pressure of the force feed pump to which it is attached will cause its piston plunger not only to advance when lubricating but to be forced back after lubricating, due to the difference in the piston areas of the respective chambers hereinafter designated as 4 and A.

My invention is particularly characterized by the combination of a pressure-fed portable lubricant-injecting device of fixed capacity with a plurality of variable metering or measuring devices that may be adjusted accurately to control the quantities of lubricant delivered to bearings of different size and thereby obviate waste of lubricant.

In the accompanying drawing, in which similar parts are designated by the same reference numbers, Figure 1 is a longitudinal section of the device showing the respective positions of the parts thereof before the measured charge of lubricant has been forced into the machine part to which the device is detachably connectible through the use of suitable fittings;

Fig. 2 is a similar sectional view showing the various parts in the positions they occupy when a measured charge of lubricant equal to the capacity of chamber A is discharged into the fitting; and Figs. 3 and 4 are transverse sectional views along lines 3 and 4 respectively of Fig. 1.

The nozzle of my improved device comprises an outer casing or barrel 1, having a keyway 1' for a purpose hereinafter described, and said barrel may be tapered at the nozzle end so as to provide clearance or easy access to fittings, and has an integral flange 1a which acts as an abutment for the stop member 21' hereinafter described. Said barrel 1 is closed at its inlet end by a pierced cap 2, to which is attached a hollow piston rod 3, through which lubricant is delivered to the cylindrical chamber 4 surrounding the piston rod on the cap side of the piston head 5 through holes 6 in the piston rod opening into said chamber.

The hollow piston rod 3 is closed at its innermost end and projects into the casing or barrel substantially or nearly to midway, sufficiently far to permit the full stroke of the piston being made in the cylinder, and said piston rod carries the piston head 5, consisting of a metal washer 5' and two cup leathers 5a and 5b, 5a being on the cap side of the piston head and 5b being on the outlet or nozzle side of the piston head.

Mounted within the barrel, and, so as to have relative sliding movement therewith, is a sleeve or shell 7 which loosely surrounds an inner cylindrical sleeve 11 in such manner that lubricant in the chamber 4 may pass above the top of said inner sleeve and around its outside wall and between it and the inside wall of the shell 7 from whence it will pass into the chamber A formed in the cylindrical sleeve 7 on the outlet or nozzle side of the piston head in a manner hereafter described.

The shell 7 has an integrally formed head 8 which surrounds the piston rod and has a coaxially-disposed threaded recess for a similarly threaded knurled-head packing nut 9, which nut compresses the packing 10 and thereby maintains a leak-proof joint between the inner side of the shell 7 and the hollow piston rod and the space between the head of the shell 7 and the pierced cap 2. Said head 8 is also provided with a key 8a which slides in the keyway 1' and prevents the head 8 and its attached cylindrical members from rotational movement in the barrel.

The cylindrical sleeve 11 is closed at its forward end by a pierced solid portion 12 which has screwthreaded engagement with the shell 7 at its forward end and moves therewith. Said solid portion 12 is provided with a peripheral flange 12' against which the base of the shell 7 abuts.

The solid portion 12 is provided with a circumferential groove 13 which registers with the transverse passageways 14 which in turn communicate with a central passageway 15 closed at its upper end by a cap in which a spring pressed ball valve 15' is mounted and the passageway 15 opens into a recessed chamber 16 formed at the lower end of said solid portion 12.

Said solid portion is pierced or provided with passageways as at 17 and 18 permitting lubricant to flow from the interior of the inner sleeve into the chamber 16 and vice versa. Said chamber 16 is formed in part by a screwthreaded extension of the solid portion 12, designated 19 in the drawing, and said screwthreaded extension 19 is adapted to engage a nozzle member 20 provided with engaging means for engaging the head of a fitting, such as the one illustrated as 21.

I provide a screwthreaded connector 21a upon which I mount a nut or disk 21' having a similar thread so that the nut may be raised or lowered on the connector to a predetermined point. The nut will engage the flange 1a of the barrel and prevent the further advance of the barrel 1 and the piston 5.

In said chamber suitable sealing means may be provided, and I have shown a sealing disk 22, a leather gasket 22'. A hollow or perforated member 23 having an inwardly projecting peripheral flange 24 which acts as a valve seat for a valve 25 and valve stem 26 are also mounted in said chamber 16, the stem projecting into passage 15 and reciprocating partially therein. Said valve consists of the enlargement of the valve stem 26 and has a beveled portion adapted to normally seat upon the inner edge of the flange 24.

The inner end of the valve stem is provided with an axial passageway 27 permitting communication with the transverse passageways 14 through passage 15, when the passage 27 is not closed by the ball valve 15', and said passageways communicate with passageways 28 in the valve, which in turn communicate with the chamber 16. A comparatively strong coiled expansion spring 29 surrounding the valve stem, is mounted so as to abut against the head of a packing nut 29a which surrounds the valve stem and which is screwed into the upper wall of the recessed chamber 16 to hold a packing member 29b which makes a fluid tight seal for said valve stem, and the other end of the spring abuts against the rear of the valve 25 so as to normally position the valve against its seat.

The valve stem projects below the valve 25 and serves as an abutment head 30. I have shown it provided with a transverse groove 31 permitting lubricant to enter the fitting but any other suitable means may be adopted.

Upon removing the nozzle from the fitting, the valve 25 is closed by the spring 29 and passageway 27 is opened, thus operatively permitting the flow of lubricant from chamber 4 to chamber A, which operation forces the moving parts into the position shown in Fig. 1.

The operation of my device is as follows:
The pump forces lubricant through the hollow piston rod 3, thence through holes 6 into chamber 4, thence over top of cylindrical member 11, and between its outer walls and the inner walls of the shell 7 thence around groove 13, thence through the transverse passageways 14, thence into central passageway 15, thence through passageway 27 in the valve stem 26, thence through passages 28 in the valve 25, thence into chamber 16, thence through passages 17 and 18 into the chamber A.

Having once filled the chamber A with lubricant, the operation is as follows:

Set the stop nut 21' at a predetermined distance (which may be obtained from experiment to get volume of bearing area to be filled) then push barrel 1 over fitting and engage nozzle member 20 to fitting 21. This action unseats valve 25 from its seat 24, and causes passageway 27 in valve stem 26 to be closed by engaging the spring pressed ball valve 15', at which time, the fitting being fixedly attached to the device about to be lubricated and being rigidly engaged by the nozzle member 20, which, as hereinafter shown, has screwthreaded engagement with the sleeve or shell 7 and the cylindrical inner sleeve 11, the pressure from the force-feed pump causes the piston 5 and the barrel 1 to advance, thus forcing the lubricant in chamber A to escape through the passages 17 and 18 thence through chamber 16, around valve head 25 and the abutment head 30 and through the groove 31 into the fitting, and the lubricant in said chamber A will be forced into the fitting unless and until the flanged end 1a of the barrel 1 engages the stop nut 21' upon the fitting or other device to which the fitting is attached.

While I have described the preferred embodiments of my invention it is to be understood that it is capable of other adaptations and modifications within the scope of the appended claims.

What I claim is:—

1. The combination with a hollow fitting having an extending screw threaded member and a similarly threaded stop member adapted to be screwed into various predetermined positions thereon, of an injecting instrument of unvarying or fixed capacity adapted for fluid connection with said fitting, said injecting instrument being adapted for connection to a source of fluid supply under pressure, and means adapted to contact with said stop member and to arrest the discharge of lubricant from the injecting instrument upon contacting with said stop member.

2. The combination with a hollow coupling member having adjustable stopping means, of an injecting instrument of fixed or unvarying capacity adapted for connection to a source of fluid supply under pressure for accurately varying the quantities of lubricant delivered to bearings by an injecting instrument, said adjustable stopping means being adapted to engage a member on the injecting instrument whereby the flow of lubricant through the injecting instrument into the hollow coupling member will be arrested.

3. The combination with a hollow coupling member having adjustable stopping means, of an injecting instrument of unvarying or fixed capacity adapted for fluid connection with said hollow coupling member, said injecting instrument being adapted for connection to a source of fluid supply under pressure, and fluid pressure operated means adapted to contact with said stopping means and to arrest the discharge of lubricant from the injecting instrument upon contacting with said stop member.

4. The combination with a hollow fitting connected to an extending screwthreaded member and having a similarly threaded stop member adapted to be screwed into adjustable positions thereon, of an injecting instrument adapted to engage said fitting and connected to a source of supply under pressure, said injecting instrument having a cylinder and a piston reciprocable in said cylinder, and means permitting the reciprocation of the piston in the cylinder, said means being operated by the engagement and disengagement of the hollow fitting, said piston being moved in both directions by the pressure of the supply, an abutment member on the injecting instrument adapted to abut against said stop member and means connecting the piston to said abutment member whereby the power stroke of the piston will be arrested upon the contact of said abutment member against said stop member.

5. A lubricating device comprising a casing, a pair of opposed relatively movable pistons therein, means for admitting fluid under pressure to a space between the pistons, a pierced member slidable relative to one of said pistons and adapted to be spaced therefrom, means of communicating from the first named space around and through said pierced member into a space between said pierced member and the last mentioned piston, a valve controlled discharge outlet in communication with last mentioned space, coupling means on said pierced member and adapted, upon coupling, to obstruct said means of communication and to open said discharge outlet whereby pressure developed in the space between the movable pistons displaces one of said pistons towards pierced member and displaces fluid from the last named space through the discharge outlet.

6. A lubricant metering system having a fluid receiving chamber, relatively movable parts defining the ends of said chamber, a fitting adapted for connection to one of said parts, discharge means through the last named part for connecting the chamber to the fitting, an adjustable stop member on said fitting engageable by the other part, one of said parts being adapted for movement by fluid pressure towards the other part to diminish the space therebetween, whereby to expel fluid into said fitting in an amount dependent upon the adjustment of said stop member.

7. The combination with a hollow coupling member, of an injecting instrument connected to a source of lubricant supply under pressure, said injecting instrument comprising an outer casing, a pierced cap at the inlet end, a reciprocable nozzle mounted in the outlet end adapted to engage said hollow member, a valve normally closing the nozzle and adapted to be opened upon coupling the hollow member to the nozzle, a hollow piston rod rigidly mounted in said casing, closed at its piston carrying end, its hollow portion registering with the pierced opening of the cap, a shell mounted in said outer casing, a cylindrical inner sleeve mounted in said shell, said sleeve having a pierced solid portion near the outlet end, connections connecting said sleeve to the nozzle and to the shell so that they move as a unit, a piston on said piston rod reciprocable in said sleeve, a port in the hollow piston rod at the cap side of the piston, closing and sealing means for said shell around said piston rod engaging the same at the cap side of said port, passageways leading from the rear of the piston to a chamber comprising the interior of the sleeve between the piston and the pierced solid portion of the sleeve permitting lubricant under pressure to flow thereinto, and control means adapted to shut off said flow and to permit the pressure of the lubricant to operate the piston whereby the lubricant is forced out of said chamber and through the nozzle into the hollow member.

8. The combination with a hollow coupling member, of an injecting instrument connected to a source of lubricant supply under pressure, said injecting instrument comprising an outer casing, a pierced cap at the inlet end, a reciprocable nozzle mounted in the outlet end adapted to engage said hollow member, a valve and a valve seat in said nozzle and means for normally holding the nozzle closed, said valve being adapted to be opened upon coupling the hollow member to the nozzle, a hollow piston rod rigidly mounted in said casing, closed at its piston carrying end, its hollow portion registering with the pierced opening of the cap, a shell mounted in said outer casing, a cylindrical inner sleeve mounted in said shell, said sleeve having a pierced solid portion near the outlet end, sealed connections connecting said sleeve to the nozzle and to the shell so that they move as a unit, a piston on said piston rod reciprocable in said sleeve, a port in the hollow piston rod at the cap side of the piston, closing and sealing means for said shell around said piston rod engaging same on the cap side of said port, passageways leading from the rear of the piston to a chamber comprising the interior of the sleeve between the piston and the pierced solid portion of the sleeve permitting lubricant under pressure to flow thereinto, and control means adapted to shut off said flow and to permit the pressure of the lubricant to operate the piston whereby the lubricant is forced out of said chamber and through the nozzle into the hollow member, and an adjustable stopping member on said hollow coupling member, and means adapted to engage said stopping member and to thereupon stop the discharge of lubricant from said injecting instrument.

9. The combination with a hollow coupling member, of an injecting instrument connected to a source of lubricant supply under pressure, said injecting instrument comprising an outer casing, a pierced cap at the inlet end, a nozzle mounted in the outlet end and reciprocable in said casing, and means in said nozzle for engaging the hollow coupling member and means for sealing the hollow coupling member to the nozzle, a valve and a valve seat in said nozzle and means for normally holding said valve against its seat to maintain the nozzle closed, said valve being adapted to be opened upon coupling the hollow coupling member to the nozzle, a hollow valve stem upon which said valve is mounted, a port in the valve communicating with the hollow valve stem; a hollow piston rod rigidly mounted in said outer casing, closed at its piston carrying end, its hollow portion registering with the pierced opening of the cap, a shell mounted in said outer casing, a cylindrical inner sleeve mounted in said shell, said sleeve having a pierced solid portion near the outlet end, said piercing constituting a port therein, a groove around said solid portion, a transverse passageway in said solid portion communicating with said groove, a central passageway in said solid portion with which said transverse passageway communicates and in which the hollow valve stem is slidably mounted sealing means in said central passageway permitting the valve stem to slide therein without leakage around its outside wall, closing means for said central passageway on the cap side thereof, valve means mounted in said central passageway adapted to engage the upper end of the hollow valve stem and to close the same when the fitting is engaged to the nozzle of the injecting instrument; a sealed connection connecting the sleeve to the nozzle and to the shell so that they move as a unit with respect to the outer casing, piston rod and piston, a chamber surrounding said valve and valve stem with which the port of the valve communicates, said chamber also communicating with the port in said pierced solid portion a piston on the hollow piston rod reciprocable in said sleeve, a port in the hollow piston rod at the cap side of the piston, a head on said shell surrounding said piston rod at the cap side of its port, and suitable sealing means for said head, a passageway communicating with the port in said hollow piston rod and the groove in said solid portion of the sleeve, a chamber in said cylindrical sleeve comprising the space between the pierced solid portion and the piston, said chamber communicating with the chamber surrounding the valve and valve sleeve through the port in said pierced solid portion, and means preventing the shell and its associated parts from revolving with respect to the outer casing.

10. The combination with a hollow coupling member, of an injecting instrument connected to a source of lubricant supply under pressure, said injecting instrument comprising an outer casing, a pierced cap, a nozzle mounted in the outlet end and reciprocable in said casing, means in said nozzle for engaging the hollow coupling member, and means for sealing the nozzle and the hollow coupling member, a valve and a valve seat in said nozzle, and means for normally holding said valve against its seat to maintain the nozzle closed, said valve being adapted to be opened upon coupling the hollow coupling member to the nozzle, a hollow valve stem upon which said valve is mounted, a port in the valve communicating with the hollow valve stem, a hollow piston rod rigidly mounted in said outer casing, closed at its piston carrying end, its hollow portion registering with the pierced opening of the cap, a shell mounted in said outer casing, a cylindrical inner sleeve mounted in said shell, said sleeve having a pierced solid portion near the outlet end, said piercing constituting a port therein, a groove around said solid portion, a transverse passageway in said solid portion communicating with said groove, a central passageway in said solid portion with which said transverse passageway communicates and in which the hollow valve stem is slidably mounted, sealing means in said central passageway permitting the valve stem to slide therein without leakage around its outside wall, closing means for said central passageway adapted to engage the upper end of the hollow valve stem and to close the same when the fitting is engaged to the nozzle of the injecting device, a sealed connection connecting the sleeve to the nozzle and to the shell so that they move as a unit with respect to the outer casing piston rod and piston, a chamber surrounding said valve and valve stem with which the port in the valve communicates, said chamber also communicating with the port in said pierced portion of the sleeve, a piston on the hollow piston rod reciprocable in said sleeve, a port in the hollow piston rod at the cap side of the piston, a head on said shell surrounding said piston rod at the cap side of its port, suitable sealing means for said head, a passageway communicating with the port in said hollow piston rod and the groove in said solid portion of the sleeve, a chamber in said cylindrical sleeve comprising the space between the pierced solid portion and the piston, said chamber communicating with the chamber surrounding the valve and valve stem through the port in the solid portion, and means preventing the shell and its associated parts from revolving with respect to the outer casing, and means for stopping the power stroke of the piston at any predetermined point.

11. In a high pressure lubricating system, the combination with a hollow receiving member, of a lubricant injecting device of fixed capacity adapted for fluid connection to a source of lubricant supply under pressure, said lubricant injecting device having an inlet and an outlet member, a discharge orifice in said outlet member, a valve normally closing said orifice and having an extension through the orifice by which the valve is opened when the outlet member is connected to the hollow receiving member, a cylinder, a piston reciprocable in said cylinder, passageways adapted to direct lubricant under pressure to flow from the inlet side of the piston to the outlet side thereof, and means for blocking said flow and for discharging lubricant from the cylinder on the outlet side of the piston while the discharge orifice of the outlet member is not closed by its valve.

12. In a lubricant device having an inlet adapted for connection to a source of supply under pressure and having an outlet chamber adapted for connection to a lubricant receptacle, a discharge orifice in said outlet chamber, a valve normally closing said orifice and having an extension through the orifice by which the valve is opened when the outlet is connected to a lubricant receptacle, a cylinder, a piston reciprocable in said cylinder, and valve controlled passages adapted to deliver lubricant under pressure to move the piston in one direction when the valve in the discharge orifice of the outlet chamber is seated and to move the piston in an opposite direction upon coupling the device with a lubricant receptacle.

13. The combination with a hollow receiving member, of a lubricant injecting device having a pierced inlet end and a pierced outlet end, said inlet end being adapted for fluid connection to a source of lubricant supply under pressure, said outlet end being adapted for fluid connection with said receiving member, a cylinder and a piston reciprocable in said cylinder and forming a measuring chamber on one side thereof and a pressure chamber on the other side thereof, the piston area in the measuring chamber being greater than the piston area in the pressure chamber, passageways permitting the flow of lubricant from the pressure chamber to the measuring chamber, and valve means adapted to arrest the flow of lubricant from the pressure chamber to the measuring chamber and to permit the flow of lubricant from the measuring chamber to the hollow receiving member upon coupling said hollow receiving member to said injecting device.

In testimony whereof I affix my signature.

DAVID R. HILLIS.